United States Patent
Ko et al.

(10) Patent No.: US 11,939,008 B2
(45) Date of Patent: Mar. 26, 2024

(54) STEER-BY-WIRE TYPE POWER STEERING APPARATUS

(71) Applicant: HL MANDO CORPORATION, Gyeonggi-do (KR)

(72) Inventors: Kyung Min Ko, Seoul (KR); Jung Sik Park, Gyeonggi-do (KR)

(73) Assignee: HL MANDO CORPORATION, Gyeonggi-Do (KR)

( * ) Notice: Subject to any disclaimer, the term of this patent is extended or adjusted under 35 U.S.C. 154(b) by 1367 days.

(21) Appl. No.: 16/389,950

(22) Filed: Apr. 21, 2019

(65) Prior Publication Data
US 2019/0329816 A1    Oct. 31, 2019

(30) Foreign Application Priority Data

Apr. 25, 2018 (KR) .................. 10-2018-0048057
Sep. 4, 2018 (KR) .................. 10-2018-0105579

(51) Int. Cl.
*B62D 5/04* (2006.01)
*B62D 3/06* (2006.01)
*B62D 6/08* (2006.01)

(52) U.S. Cl.
CPC ......... *B62D 5/0445* (2013.01); *B62D 5/0457* (2013.01); *B62D 3/06* (2013.01); *B62D 6/08* (2013.01)

(58) Field of Classification Search
CPC ........ B62D 5/001; B62D 5/0424; B62D 3/06; B62D 4/0445; B62D 3/126
See application file for complete search history.

(56) References Cited

U.S. PATENT DOCUMENTS

| | | | | |
|---|---|---|---|---|
| 2008/0127762 A1* | 6/2008 | Baxter | ................. | B62D 3/126 74/422 |
| 2010/0108430 A1 | 5/2010 | Uchihara et al. | | |
| 2013/0075185 A1* | 3/2013 | Sugai | .................... | B62D 5/006 180/402 |
| 2013/0112022 A1 | 5/2013 | Shimizu | | |

(Continued)

FOREIGN PATENT DOCUMENTS

| | | |
|---|---|---|
| CN | 103287484 | 9/2013 |
| CN | 105416396 | 3/2016 |

(Continued)

OTHER PUBLICATIONS

Machine English translation of JP2009292331 Submitted by Application from espacenet.com (Year: 2009).*

(Continued)

*Primary Examiner* — Tony H Winner
(74) *Attorney, Agent, or Firm* — Ladas & Parry, LLP

(57) ABSTRACT

A steer-by-wire type power steering apparatus according to embodiments disclosed herein includes a cylinder provided inside a housing and including a first spline on an inner circumferential surface thereof, and a sliding bar inserted into the cylinder and including a second spline engaged with the first spline and a screw connected to a motor, so that friction and noise can be reduced when a sliding bar connected to a tie rod so as to steer a wheel is slid, the durability and strength of the sliding bar can be improved, and the position of the sliding bar can be determined based on a phase difference between the rotation information items of respective motors.

13 Claims, 16 Drawing Sheets

(56) References Cited

U.S. PATENT DOCUMENTS

| | | | |
|---|---|---|---|
| 2013/0220728 A1 | 8/2013 | Lee | |
| 2013/0249464 A1* | 9/2013 | Knox | H02K 7/06 |
| | | | 318/625 |
| 2016/0083008 A1 | 3/2016 | Murakami et al. | |
| 2017/0029012 A1 | 2/2017 | Tokunaga et al. | |
| 2017/0144694 A1 | 5/2017 | Stangl | |
| 2017/0369099 A1* | 12/2017 | Woo | B62D 5/0427 |
| 2020/0361523 A1* | 11/2020 | Nakamura | B62D 5/0445 |
| 2021/0053612 A1* | 2/2021 | Kondo | B62D 15/0245 |
| 2021/0053615 A1* | 2/2021 | Kondo | B62D 5/001 |

FOREIGN PATENT DOCUMENTS

| | | | | |
|---|---|---|---|---|
| CN | 207045445 | | 2/2018 | |
| DE | 41 38 884 | | 6/1993 | |
| DE | 10 2004 061 834 | | 7/2006 | |
| DE | 10 2009 038 232 | | 2/2011 | |
| DE | 10 2016 209 161 | | 11/2017 | |
| JP | 2004-306860 | | 11/2004 | |
| JP | 2009-292331 | | 12/2009 | |
| JP | 2009292331 | * | 12/2009 | B62D 5/04 |
| JP | 2012-7684 | | 1/2012 | |
| JP | 2012-45978 | | 3/2012 | |
| JP | 2013-86586 | | 5/2013 | |
| JP | 2018-119596 | | 8/2018 | |
| KR | 10-2006-0004279 | | 1/2006 | |
| KR | 10-0543245 | | 1/2006 | |
| KR | 10-2006-0032281 | | 4/2006 | |
| KR | 10-0599485 | | 7/2006 | |
| KR | 10-1070315 | | 10/2011 | |
| KR | 10-2013-0054768 | | 5/2013 | |
| KR | 10-2015-0008550 | | 1/2015 | |
| KR | 10-2016-0111065 | | 9/2016 | |
| KR | 10-2018-0000262 | | 1/2018 | |
| KR | 10-2019-0001964 | | 1/2019 | |
| WO | 2015/159758 | | 10/2015 | |

OTHER PUBLICATIONS

Office Action dated Mar. 11, 2021 for European Patent Application No. 19171046.6.

Notice of Allowance dated Feb. 3, 2020 for Korean Patent Application No. 10-2018-0105579 and its English translation from Global Dossier.

Extended European Search Report dated Mar. 16, 2020 for European Application No. 19171046.6.

Partial European Search Report dated Oct. 23, 2019 for European Application No. 19171046.6.

Office Action dated Sep. 3, 2019 for Korean Application No. 10-2018-0105579 and its English machine translation by Google Translate.

Office Action dated Sep. 2, 2022 for Chinese Patent Application No. 201910338281,4 and its English translation by Google Translate.

Office Action dated Oct. 12, 2022 for Korean Patent Application No. 10-2018-0048057 and its English translation from Global Dossier.

Notice of Allowance dated Mar. 3, 2023 for Korean Patent Application No. 10-2018-0048057 and its English translation from Global Dossier.

* cited by examiner

STEER-BY-WIRE TYPE POWER STEERING APPARATUS

CROSS REFERENCE TO RELATED APPLICATION

This application claims priority from Korean Patent Application Nos. 10-2018-0048057 & 10-2018-0105579, filed on Apr. 25, 2018 & Sep. 4, 2018, which are hereby incorporated by reference for all purposes as if fully set forth herein.

BACKGROUND OF THE INVENTION

1. Field of the Invention

Embodiments disclosed herein relate to a steer-by-wire type power steering apparatus. More particularly, the embodiments relate to a steer-by-wire type power steering apparatus, in which in a multi-motor-based steering apparatus, friction and noise are reduced when a sliding bar connected to a tie rod so as to steer a wheel is slid, the durability and strength of the sliding bar are improved, and the position of the sliding bar is determined based on a phase difference between the rotation information items of respective motors.

2. Description of the Prior Art

A steer-by-wire type power steering apparatus is a kind of electric steering apparatus that steers a vehicle using electric power without mechanical connection such as a steering column and a universal joint between a steering wheel and a front wheel steering apparatus.

That is, the operation of the steering wheel of a driver is converted into an electric signal, which is received by an electronic control unit, and the output of the motor is determined depending on the electric signal. Since such a steer-by-wire system has no mechanical connection, it is possible to reduce the driver's injuries caused by mechanical parts at collision, and since it is possible to reduce mechanical connection and hydraulic components, it is possible to improve fuel economy by reducing fuel consumption by reducing unnecessary energy consumption during steering operation due to the reduction of the weight of the vehicle thanks to the reduction of the number of components and due to the simplification of assembly line thanks to substantial reduction of the number of assembly steps. In addition, ideal steering performance may be achieved through ECU programming.

In addition, many attempts have been made to ensure redundancy by providing two or more driving parts that cause a rack bar to slide in the axial direction. A conventional steer-by-wire type power steering apparatus includes a pinion shaft engaged with the rack gear of the rack bar and a ball nut engaged with a screw formed on the rack bar, so that each of the pinion shaft and the ball nut is driven by a motor. However, there is a problem in that the rack gear and the pinion gear are not properly engaged due to the torque of the motor applied to the screw, and that friction and noise are generated.

In the conventional steer-by-wire type power steering apparatus, a linear sensor and a distance sensor for measuring the position of the rack bar are used in order to stably control the steering of the vehicle. However, these sensors are poor in precision and responsiveness, and the length of the sensor is required to be as long as the movement distance of the rack bar, which causes a high cost and poor assemblability.

SUMMARY OF THE INVENTION

Embodiments disclosed herein have been conceived from the background described above, and provide a steer-by-wire type power steering apparatus, in which, in a multi-motor-based steering apparatus, friction and noise are reduced when a sliding bar connected to a tie rod so as to steer a wheel is slid, the durability and strength of the sliding bar are improved, and the position of the sliding bar is determined based on a phase difference between the rotation information items of respective motors.

The aspect of the present disclosure is not limited thereto, and other unmentioned aspects of the present disclosure may be clearly appreciated by those skilled in the art from the following descriptions.

According to the embodiments disclosed herein, it is possible to provide a steer-by-wire type power steering apparatus including: a cylinder provided inside a housing and including a first spline on an inner circumferential surface thereof; and a sliding bar inserted into the cylinder and including a second spline engaged with the first spline and a screw connected to a motor.

According to the embodiments disclosed herein, it is possible to provide a steer-by-wire type power steering apparatus including: a coupling member inserted into a coupling hole formed in the housing, and including a support portion protruding into the housing; and a sliding bar provided inside the housing, the sliding bar including a slit groove, which is formed in an outer circumference surface thereof to extend in an axial direction, and into which the support portion is inserted, and a screw connected to a motor.

According to the embodiments, it is possible to provide a steer-by-wire type power steering apparatus, in which, in a multi-motor-based steering apparatus, friction and noise are reduced when a sliding bar connected to a tie rod so as to steer a wheel is slid, the durability and strength of the sliding bar are improved, and the position of the sliding bar is determined based on a phase difference between the rotation information items of respective motors.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION OF THE EXEMPLARY EMBODIMENTS

Figure 1:
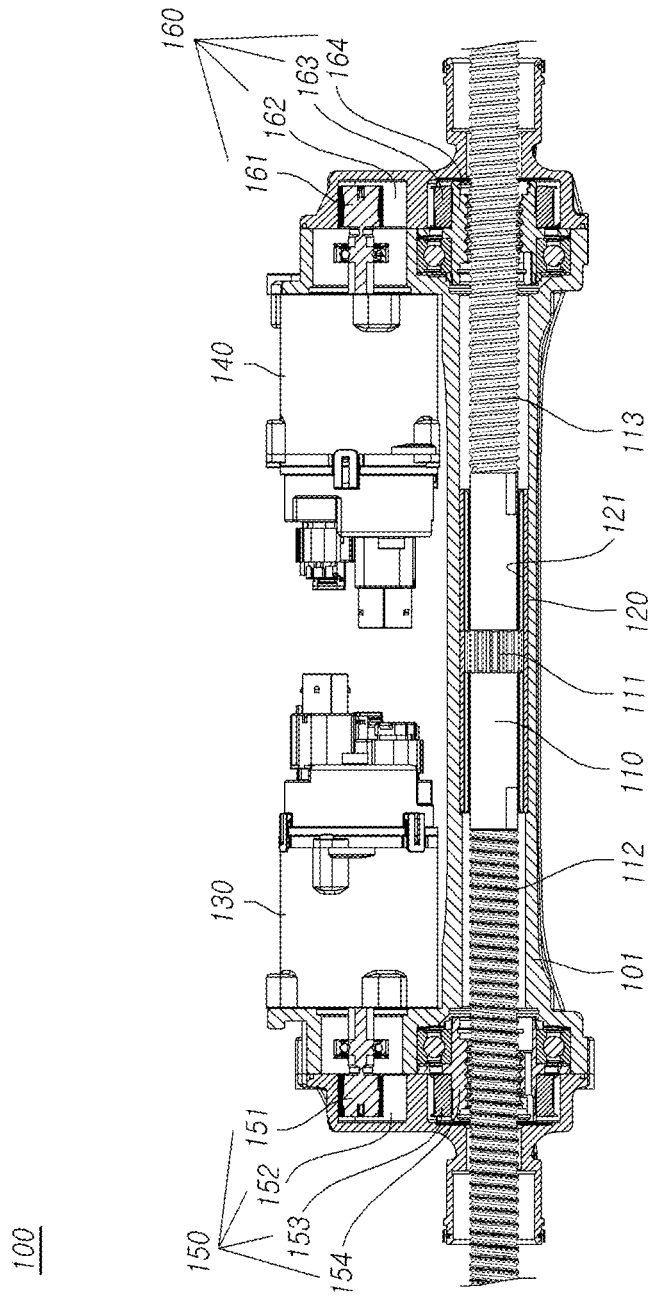
FIG. 1 is a cross-sectional view of a steer-by-wire type power steering apparatus according to embodiments.

Hereinafter, embodiments of the present disclosure will be described in detail with reference to the accompanying drawings. In adding reference numerals to elements in each drawing, the same elements will be designated by the same reference numerals, if possible, although they are shown in different drawings. Further, in the following description of the present disclosure, a detailed description of known functions and configurations incorporated herein will be omitted when it may make the subject matter of the present disclosure rather unclear.

In addition, terms, such as first, second, A, B, (a), (b) or the like may be used herein when describing components of the present disclosure. These terms are merely used to distinguish one structural element from other structural elements, and a property, an order, a sequence and the like of a corresponding structural element are not limited by the term. It should be noted that if it is described in the specification that one component is "connected," "coupled" or "joined" to another component, a third component may be "connected," "coupled," and "joined" between the first and second components, although the first component may be directly connected, coupled or joined to the second component.

Figure 2:
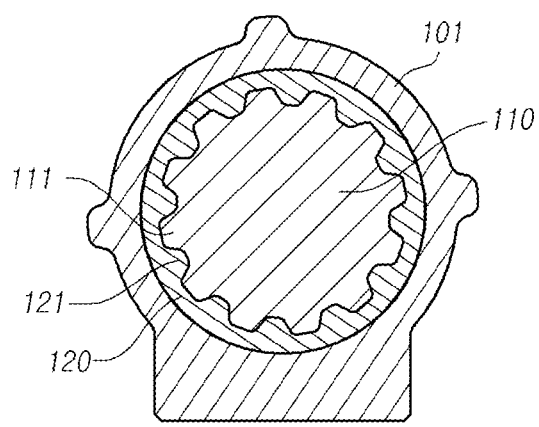
FIG. 2 is a cross-sectional view of a part of FIG. 1.
Figure 3:
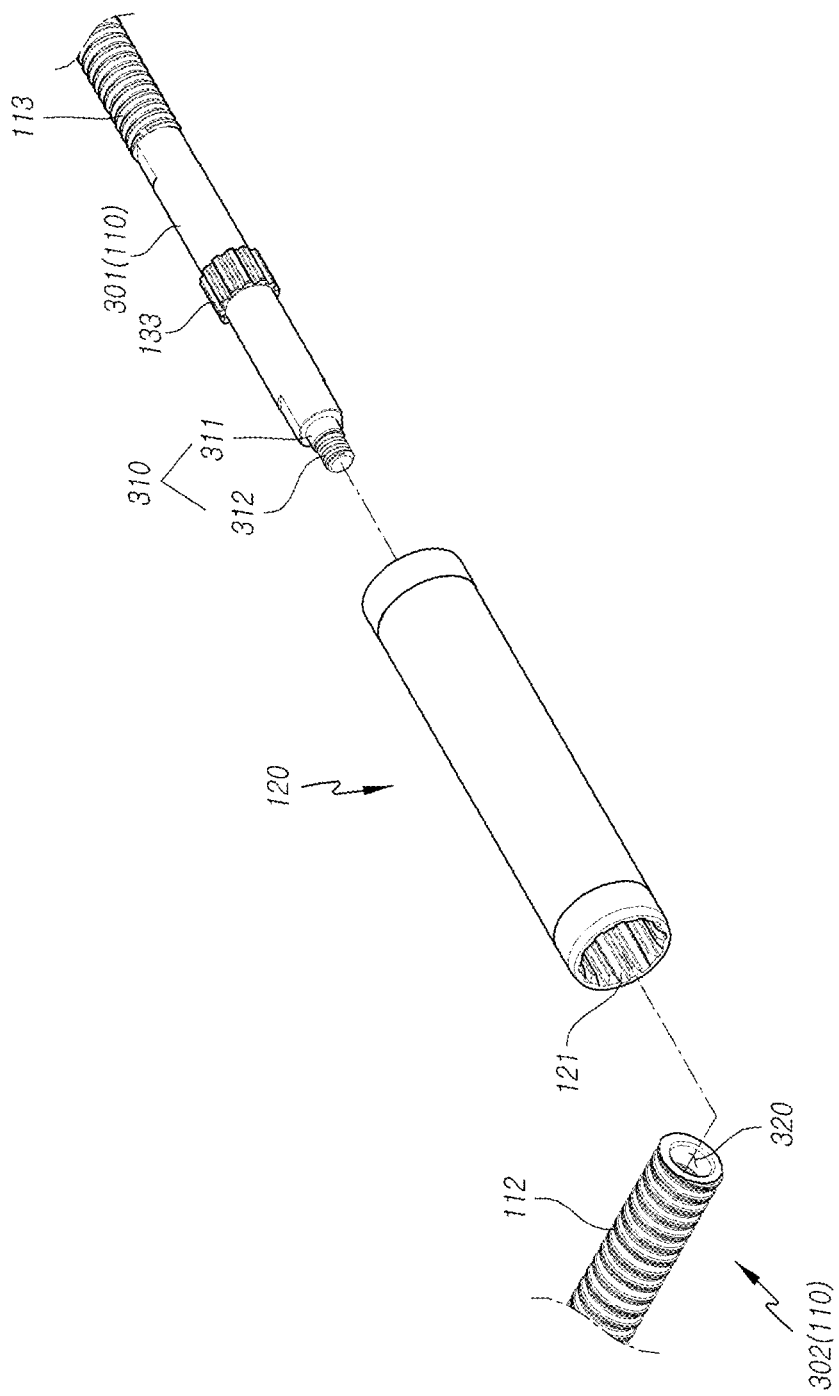
FIG. 3 is an exploded perspective view of a part of FIG. 1.
Figure 4:
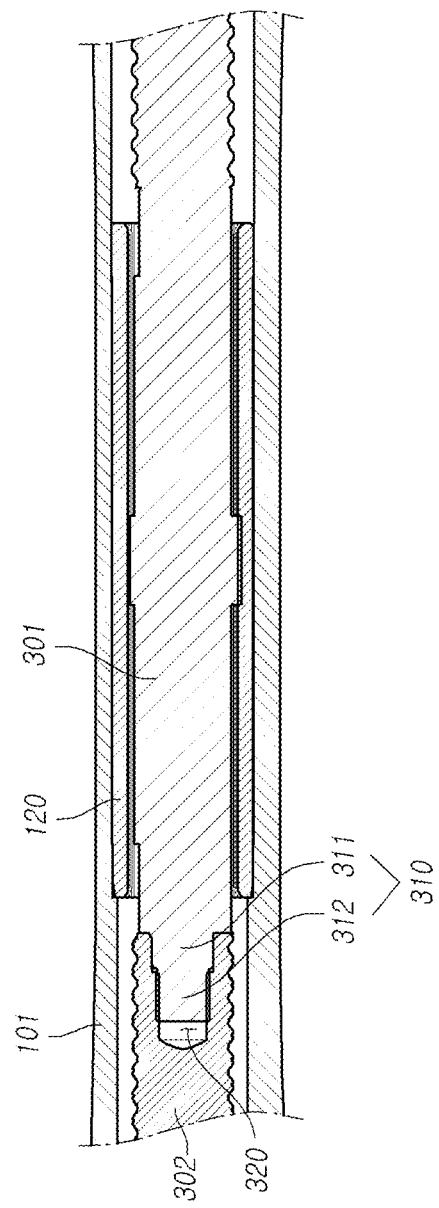
FIGS. 4 and 5 are cross-sectional views of a part of a steer-by-wire type power steering apparatus according to embodiments.
Figure 5:
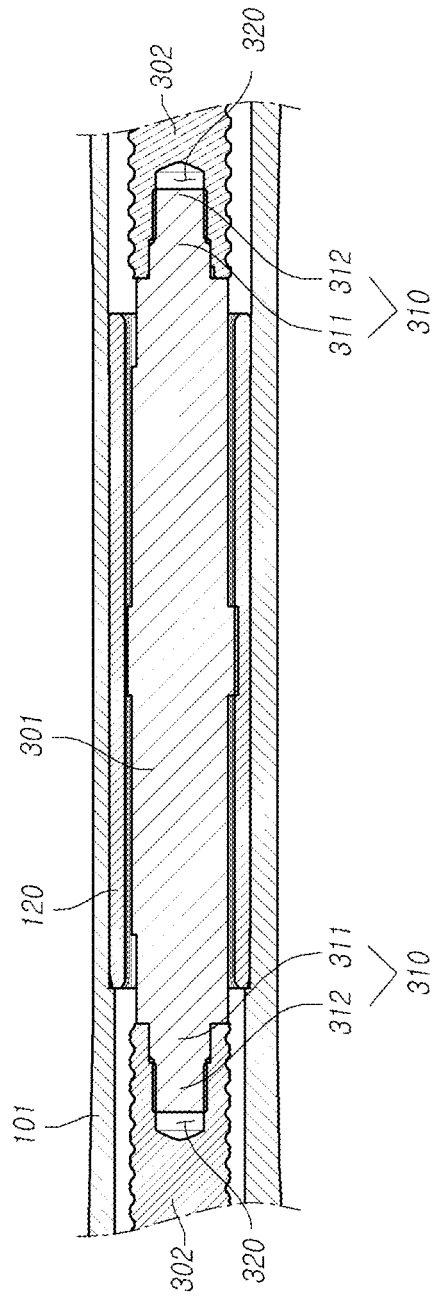
Figure 6:
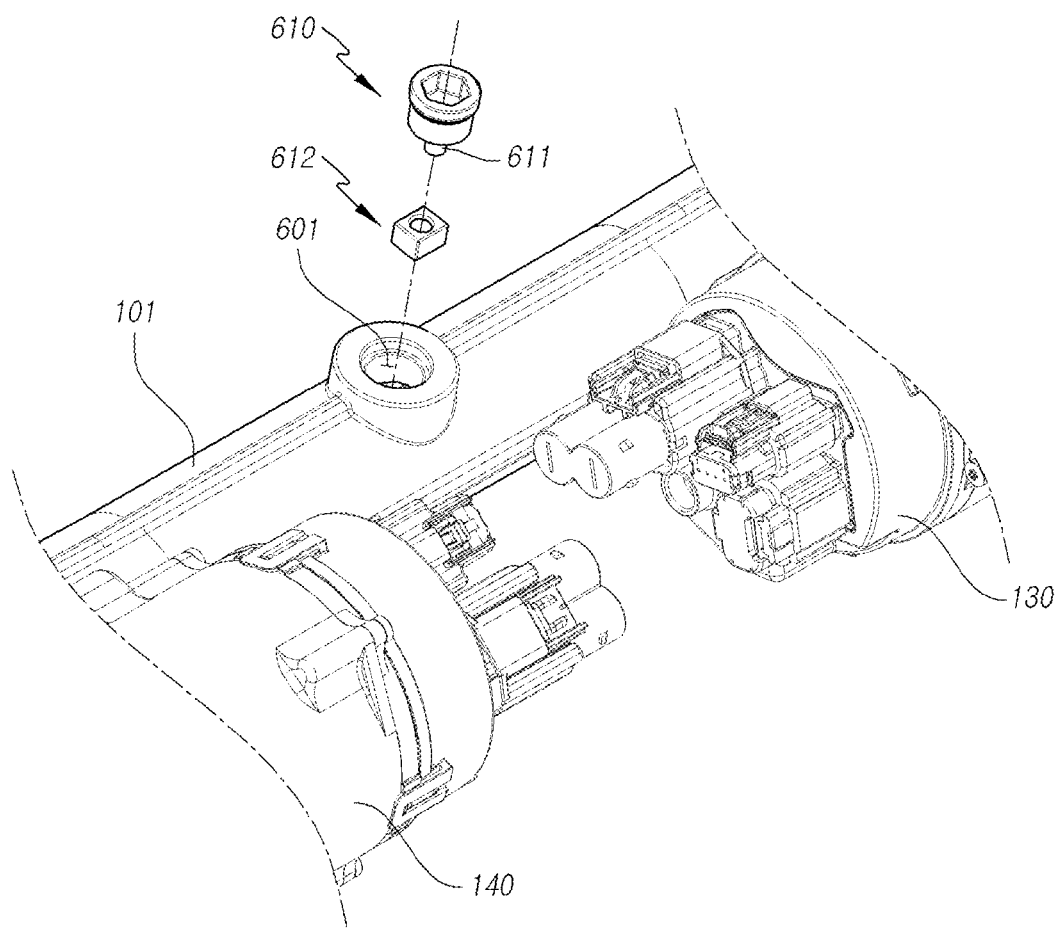
FIG. 6 is an exploded perspective view of a part of a steer-by-wire type power steering apparatus according to embodiments.
Figure 7:
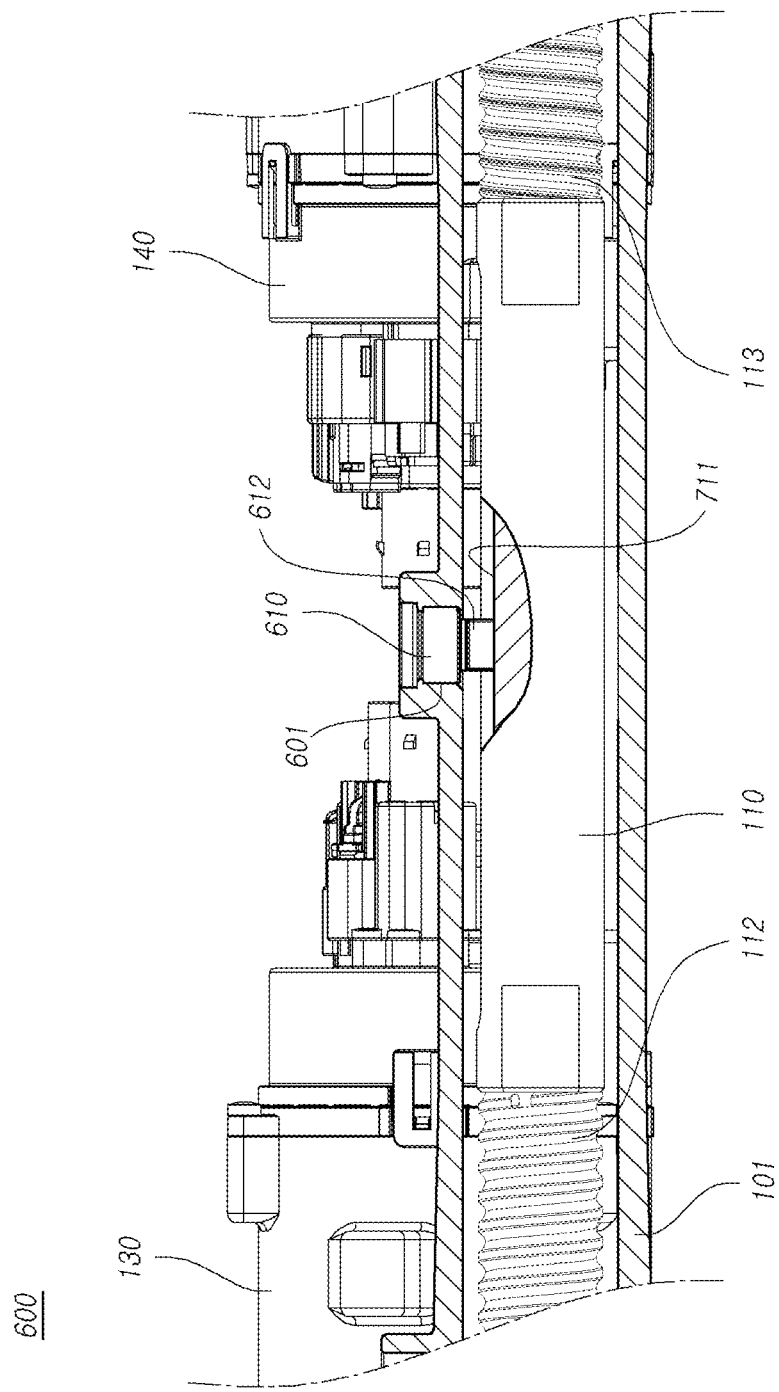
FIG. 7 is a cross-sectional view of a steer-by-wire type power steering apparatus according to embodiments.
Figure 8:
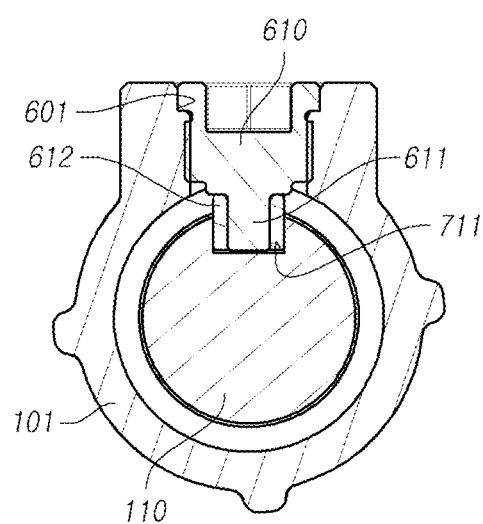
FIG. 8 is a cross-sectional view of a part of FIG. 7.
Figure 9:
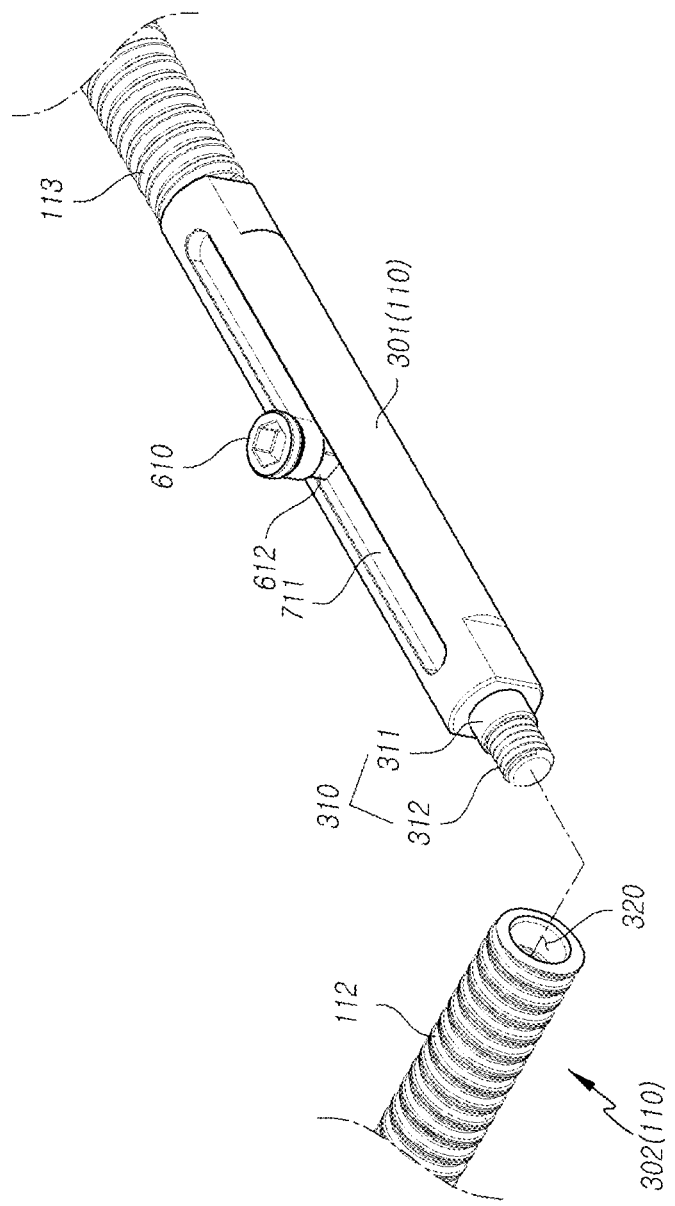
FIGS. 9 and 10 are exploded perspective views of a part of a steer-by-wire type power steering apparatus according to embodiments.
Figure 10:
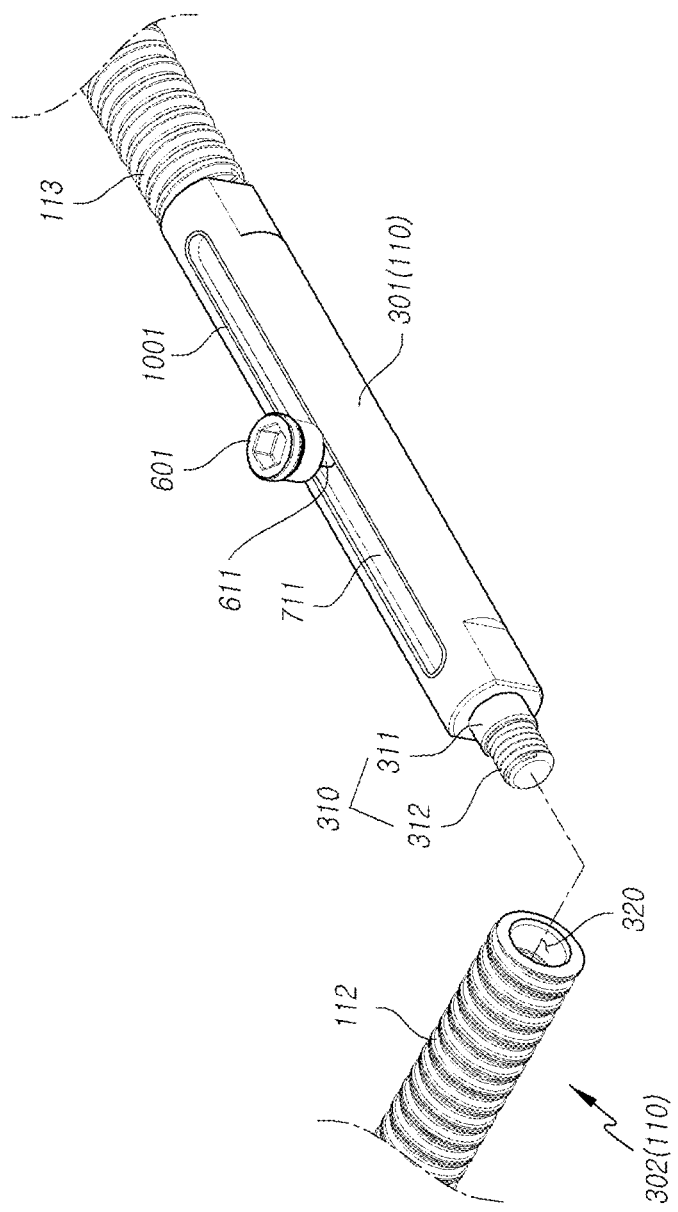
Figure 11:
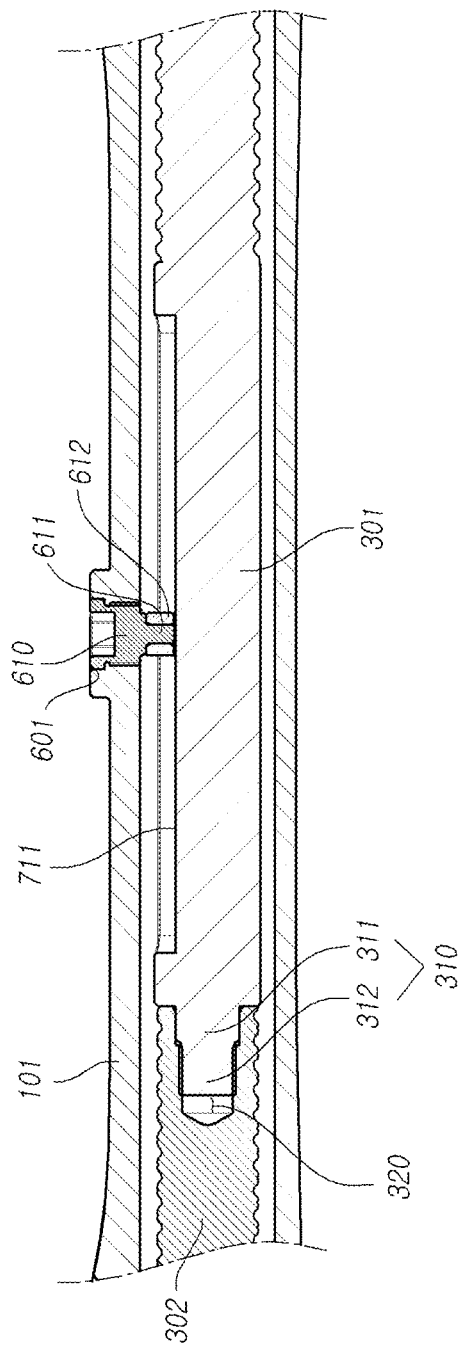
FIGS. 11 and 12 are cross-sectional views of a part of a steer-by-wire type power steering apparatus according to embodiments.
Figure 12:
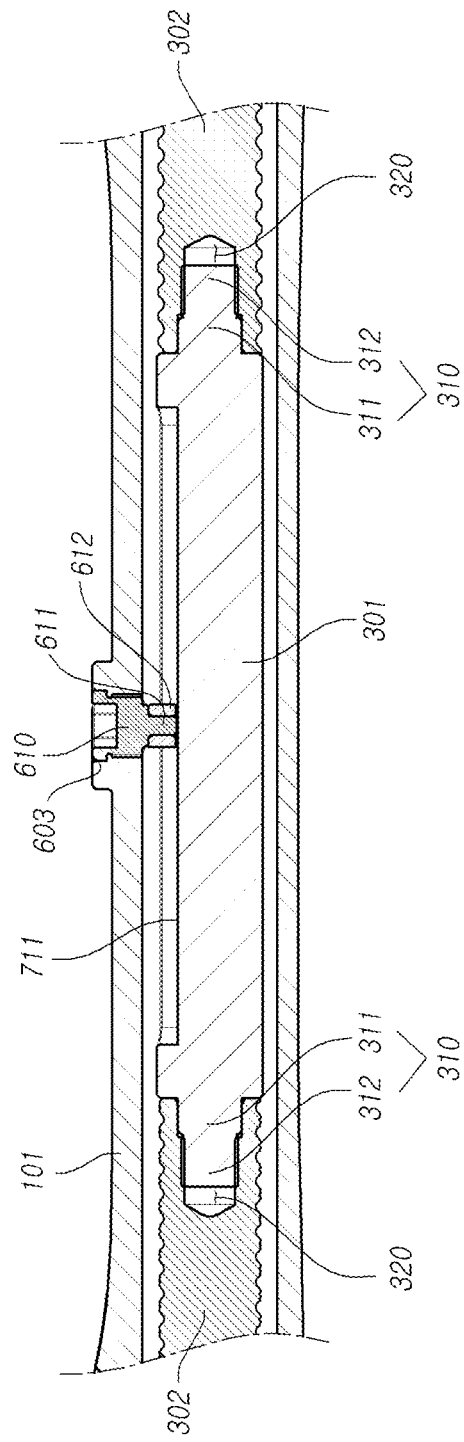
Figure 13:
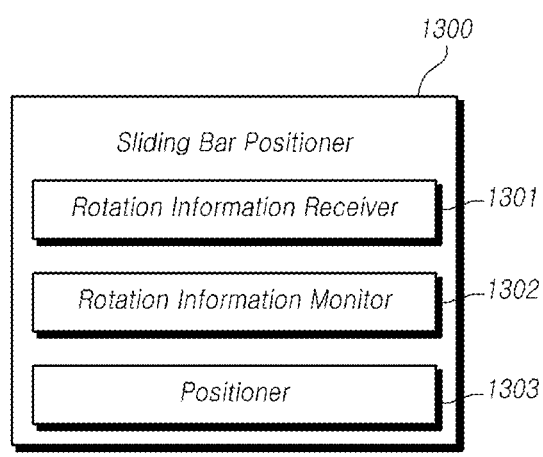
FIG. 13 is a block diagram for a part of a steer-by-wire type power steering apparatus according to embodiments.
Figure 14:
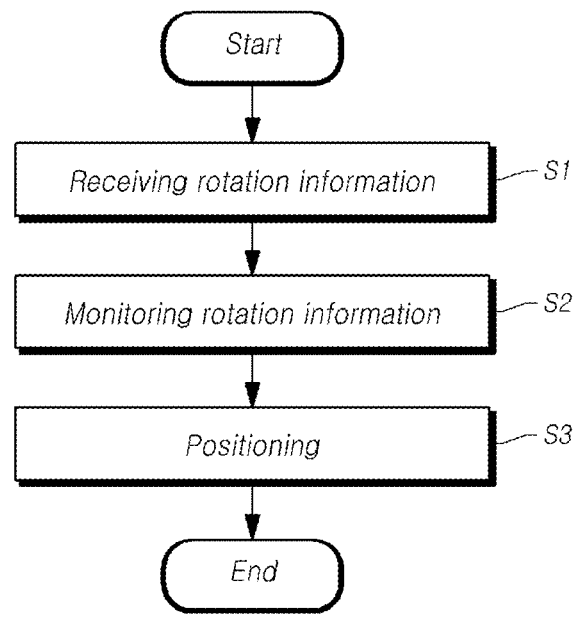
FIG. 14 is a flow chart of a positioning method by a steer-by-wire type power steering apparatus according to embodiments.
Figure 15:
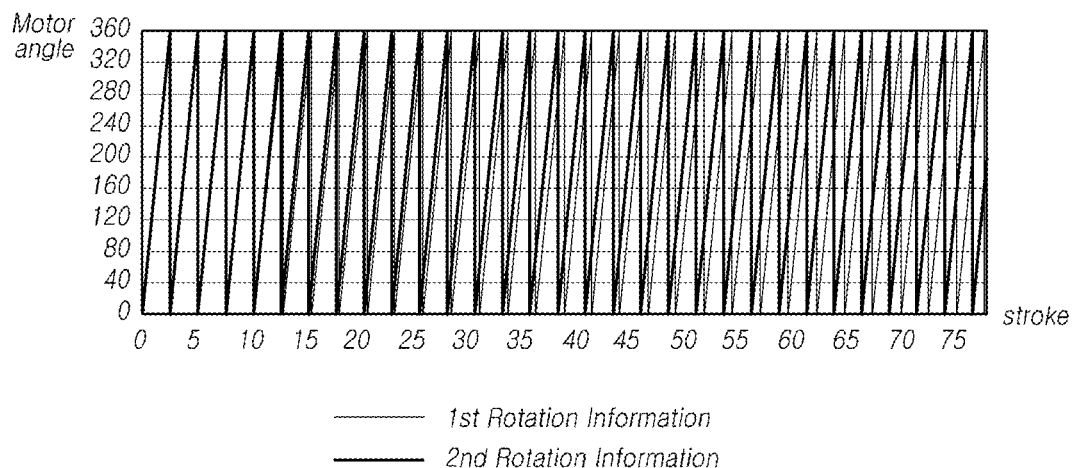
FIG. 15 is a view for explaining a positioning method by a steer-by-wire type power steering apparatus according to embodiments.
Figure 16:
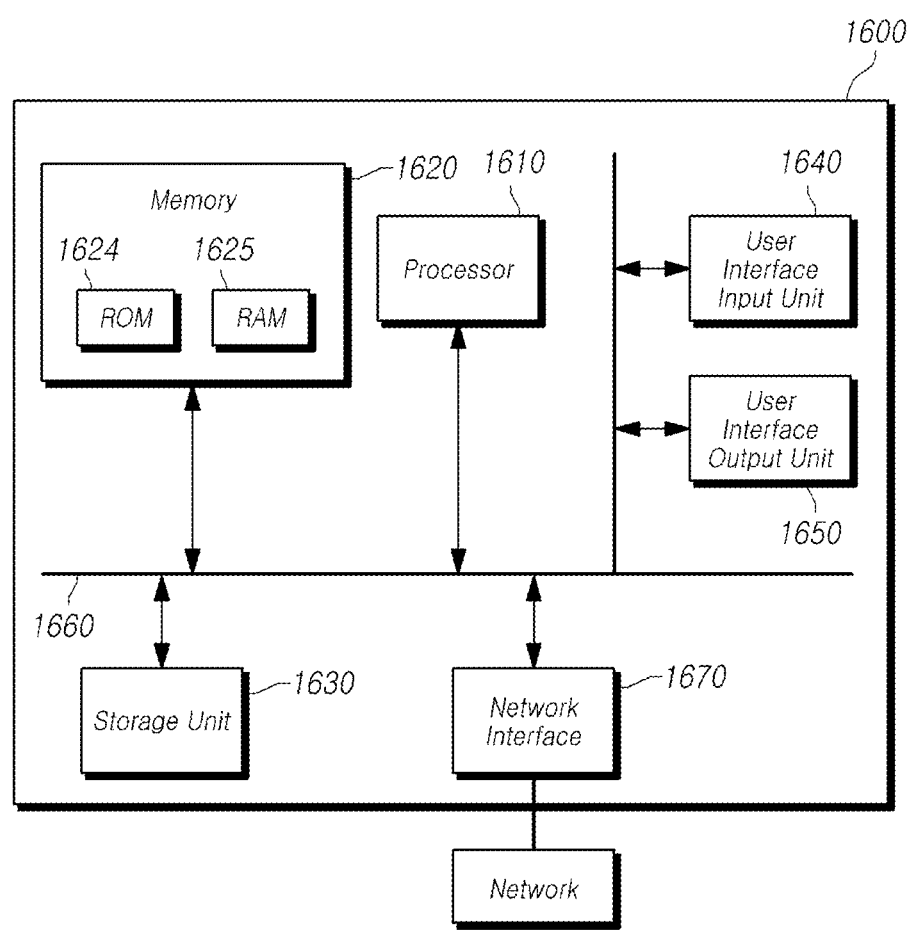
FIG. 16 is a block diagram for a part of a steer-by-wire type power steering apparatus according to embodiments.

FIG. 1 is a cross-sectional view of a steer-by-wire type power steering apparatus according to embodiments, FIG. 2 is a cross-sectional view of a part of FIG. 1, FIG. 3 is an exploded perspective view of a part of FIG. 1, FIGS. 4 and 5 are cross-sectional views of a part of a steer-by-wire type power steering apparatus according to embodiments, FIG. 6 is an exploded perspective view of a part of a steer-by-wire type power steering apparatus according to embodiments, FIG. 7 is a cross-sectional view of a steer-by-wire type power steering apparatus according to embodiments, FIG. 8 is a cross-sectional view of a part of FIG. 7, FIGS. 9 and 10 are exploded perspective views of a part of a steer-by-wire type power steering apparatus according to embodiments, FIGS. 11 and 12 are cross-sectional views of a part of a steer-by-wire type power steering apparatus according to embodiments, FIG. 13 is a block diagram for a part of a steer-by-wire type power steering apparatus according to embodiments, FIG. 14 is a flow chart of a positioning method by a steer-by-wire type power steering apparatus according to embodiments, FIG. 15 is a view for explaining a positioning method by a steer-by-wire type power steering apparatus according to embodiments, and FIG. 16 is a block diagram for a part of a steer-by-wire type power steering apparatus according to embodiments.

Hereinafter, descriptions will be made with reference to FIGS. 1 to 5.

A steer-by-wire type power steering apparatus 100 according to embodiments includes a cylinder 120 provided in a housing 101 and including a first spline 111 on the inner peripheral surface thereof and a sliding bar 110 including a second spline 121 inserted into the cylinder 120 and engaged with the first spline 111 and screws 112 and 113 connected to motors 130 and 140.

The housing 101 is formed to be extend in the width direction of the vehicle. The housing 101 is hollow and includes the cylinder 120 and the sliding bar 110 therein.

The opposite ends of the sliding bar 110 are connected with tie rods (not illustrated), respectively, and as the sliding bar 110 slides in the axial direction, the wheels (not illustrated) connected to the tie rods are steered.

The sliding bar 110 includes screws 112 and 113 formed on the outer peripheral surface thereof. As will be described below, the torque of the motors 130 and 140 is transmitted to the sliding bar 110 by a first gear box 150 and a second gear box 160 that are coupled with the screw 112 and 113, respectively, and the sliding bar 110 is slid in the axial direction.

In this case, in order for the sliding bar 110 to be slid in the axial direction while receiving the torque of the motors 130 and 140, it is necessary to prevent the slide bar 110 from rotating around the central axis. The cylinder 120 prevents the sliding bar 110 from rotating while supporting the sliding bar 110 in the circumferential direction (see FIG. 2).

The cylinder 120 is hollow and is provided inside the housing 101. For example, the cylinder 120 can be press-fitted and fixed. In addition, the cylinder 120 includes a first spline 111 formed on the inner circumferential surface thereof.

The sliding bar 110 includes a second spline 121 formed on the outer circumferential surface thereof. The sliding bar 110 is inserted into the cylinder 120 and the first spline 111 and the second spline 121 are engaged each other, so that the sliding bar 110 is supported in the cylinder 120 in the circumferential direction.

Since it is necessary for the first spline 111 and the second spline 121 to be maintained in the state of being engaged with each other when the sliding bar 110 is slid in the axial direction by the movable range of the tie rod, as illustrated in the drawing, the first spline 111 may be formed from one end to the other end in the axial direction of the cylinder 120, and the second spline 121 may be formed in the center of an anti-rotation bar 301 to be described later.

Since the first spline 111 and the second spline 121 are engaged with each other and the rotation of the sliding bar 110 is prevented, friction and noise may be reduced when the sliding bar 110 is slid in the axial direction, and the driver's steering feeling may be improved.

The sliding bar 110 may be integrally manufactured. However, the sliding bar 110 may be divided into two or more parts in order to improve manufacturing convenience and assembly convenience, and may be provided inside the housing 101 in the assembled state, as illustrated in FIG. 3.

That is, if the sliding bar 110 is integrally formed, it is difficult to process the second spline 121 and the screws 112 and 113. However, if the sliding bar 110 is divided into two or more parts, the second spline 121 and the screws 112 and 113 can be processed as separate parts, thereby improving the convenience of production.

As will be described later, the screws 112 and 113 include a first screw 112 and a second screw 113, and the sliding bar 110 is connected to the first gear box 150 and the second gear box 160. If the sliding bar 110 is integrally formed, it is difficult to assemble the gear boxes in the state in which the sliding bar 110 is inserted into the housing 101. However, if the sliding bar 110 is divided into two or more parts, the parts can be inserted into the housing 101 in the state in which the gear boxes are assembled therewith, thereby improving assembling convenience.

Accordingly, the sliding bar 110 may include an anti-rotation bar 301 including the second spline 121, and at least one screw bar 302 including the screws 112 and 113.

In the case in which the sliding bar 110 includes one screw bar 302, the screw bar 302 may include any one of the first screw 112 and the second screw 113, and the anti-rotation bar 301 may include a second spline 121 and the remaining one of the first screw 112 and the second screw 113 (see FIG. 4). In the case in which the sliding bar 110 includes two screw bars 302, the anti-rotation bar 301 may include the second spline 121, and the screw bars 302 may include the first screw 112 and the second screw 113, respectively (see FIG. 5).

The number of screw bars 302 is not necessarily limited to the above-described embodiments, and the sliding bar 110 may include a larger number of screw bars 302.

In addition, the anti-rotation bar 301 and the screw bar 302 are coupled to each other and to be slid in unison, and may be assembled inside the housing 101.

That is, one of the anti-rotation bar 301 and the screw bar 302 may include an engagement groove 320 that is recessed in the axial direction, and the other may include an engagement part 310 that is inserted into the engagement groove 320, so that the sliding bar 110 can be assembled by inserting the engagement part 310 into the engagement groove 320 in the housing 101.

The drawing illustrates an embodiment in which the anti-rotation bar 301 includes the engagement part 310 and the screw bar 302 includes the engagement groove 320. However, it is obvious that the opposite case is also possible, and one end of the anti-rotation bar 301 may include the engagement part 310 and the other end may include the engagement groove 320.

In the case in which the sliding bar 110 includes one screw bar 302, one end of the anti-rotation bar 301 may be coupled with the screw bar 302 via the engagement part 310 and the engagement groove 320. In the case in which the sliding bar 110 includes two screw bars 302, the opposite ends of the anti-rotation bar 301 may be respectively coupled to the screw bars 302 via the engagement parts 310 and the engagement grooves 320.

The engagement part 310 may be screwed to the engagement groove 320, press-fitted to the engagement groove 320, or screwed to and press-fitted to the engagement groove 320.

Although not illustrated in the drawing, the engagement part 310 and the engagement groove 320 may respectively include threaded portions so as to be screwed together, or may be press-fitted together without including the threaded portions.

In the case in which the engaging part 310 and the engagement groove 320 are screwed and press-fitted, as illustrated in the drawing, the engagement part 310 may include a large-diameter portion 311 and a small-diameter portion 312 and the engagement groove 320 may be formed to correspond to the large-diameter portion 311 and the small-diameter portion 312.

The drawing illustrating an embodiment in which the small-diameter portion 312 includes a threaded portion and the large-diameter portion 311 does not include a threaded portion. In this case, the small-diameter portion 312 is screwed to the engagement groove 320 and the large-diameter portion 311 is press-fitted to the engagement groove 320.

The sliding bar 110 receives the torque of the motors 130 and 140 and slides in the axial direction. Thus, in the case in which the engagement part 310 is screwed to the engagement groove 320, the screw-coupling may be loosened, and in the case in which the engagement part 310 is press-fitted to the engagement groove 320, a clearance may be generated by axial and radial movements and the degree of engagement may be reduced. However, by screwing and press-fitting the engagement part 310 into the engagement groove 320 via the small-diameter portion 312 and the large-diameter portion 311, it is possible to prevent the degree of engagement from being reduced.

As described above, the screws 112 and 113 may include the first screw 112 and the second screw 113, and in this case, the motors 130 and 140 may include a first motor 130 connected to the first screw 112 by the first gear box 150 and a second motor 140 connected to the second screw 113 by the second gear box 160 (see FIG. 1).

As illustrated in the drawing, with reference to the second spline 121, the sliding bar 110 may include a first screw 112 on one side in the axial direction and a second screw 113 on the other side in the axial direction.

The sliding bar 110 is slid in the axial direction while receiving the torque of the first motor 130 and the second motor 140 via the first gear box 150 and the second gear box 160.

The first gear box 150 includes a first motor pulley 151 coupled to the motor shaft of the first motor 130, a first ball nut 154 coupled to the first screw 112, a first nut pulley 153 coupled to the first motor pulley 154, and a first belt 152 connecting the first motor pulley 151 and the first nut pulley 153.

The second gear box 160 includes a second motor pulley 161 coupled to the motor shaft of the second motor 140, a second ball nut 164 coupled to the second screw 113, a second nut pulley 163 coupled to the second motor pulley 164, and a second belt 162 connecting the second motor pulley 161 and the second nut pulley 163.

The first motor 130 and the second motor 140 rotate the first ball nut 154 and the second ball nut 164 via the first belt 152 and the second belt 162, respectively, so that the torque is transmitted to the sliding bar 110, and the sliding bar 110 is slid in the axial direction while being prevented from rotating by the first and second splines 111 and 121.

In addition, the screw direction of the first screw 112 and the screw direction of the second screw 113 may be the same as each other, or may be opposite each other, so that the durability and strength of the first spline 111 and the second spline 121 can be improved (see FIG. 1).

That is, if the screws of the first screw 112 and the second screw 113 are formed in the same direction, when the sliding bar 110 is slid to one side or the other side in the axial direction, the direction of the torque applied to the sliding bar 110 by the first motor 130 and the direction of the torque applied to the sliding bar 110 by the second motor 140 coincide with each other, so that the torque corresponding to the sum of the torque of the first motor 130 and the torque of the second motor 140 will be applied to the first spline 111 and the second spline 121.

However, if the screws of the first screw 112 and the second screw 113 are formed in different directions, when the sliding bar 110 is slid to one side or the other side in the axial direction, the torque applied to the sliding bar 110 by the first motor 130 and the torque applied to the sliding bar 110 by the second motor 140 become opposite each other in direction and thus cancel out each other, so that the torque applied to the first spline 111 and the second spline 121 will be minimized and thus the durability and strength of the first spline 111 and the second spline 121 can be improved.

Meanwhile, the steer-by-wire type power steering apparatus 100 according to embodiments includes a sliding bar positioner 1300. The first motor 130 and the second motor 140 have different reduction ratios relative to the sliding bar 110, and the position of the sliding bar 110 may be determined by the sliding bar positioner 1300 based on the difference in rotation information due to the difference in the reduction ratio. A detailed description thereof will be made below.

Hereinafter, descriptions will be made with reference to FIGS. 6 to 12.

A steer-by-wire type power steering apparatus 600 according to the embodiments includes a coupling member 610 including a support portion 611 inserted into a coupling hole 601 formed in the housing 101 and protruding into the housing 101, and a sliding bar 110 formed on the outer circumferential surface to extend in the axial direction and including a slit groove 711, into which the support portion 611 is inserted, and screws 112 and 113 connected to the motors 130 and 140.

The sliding bar 110 is connected to the tie rods at the opposite ends thereof such that wheels are steered as the sliding bar 110 is slid in the axial direction.

In order to ensure that the sliding bar 110 is slid in the axial direction while receiving the torques of the motors 130 and 140, the sliding bar 110 should be prevented from rotating around the central axis. The support portion 611 is inserted into the slit groove 711, and the sliding bar 110 is supported on a coupling member 610 in the circumferential direction (see FIG. 7).

That is, the housing 101 includes the coupling hole 601 passing through the outer and inner surfaces thereof, and the coupling member 610 is inserted into the coupling hole 601 and coupled to the housing 101.

Although not illustrated in the drawing, the coupling member 610 and the coupling hole 601 have threaded portions, so that that the coupling member 610 can be screwed to the housing 101.

The sliding bar 110 includes a slit groove 711 extending in the axial direction on the outer circumferential surface of the housing 101 and the coupling member 610 includes the support portion 611 protruding into the inside of the housing 101. The support portion 611 is inserted into the slit groove 711, whereby the sliding bar 110 is slidable in the axial direction but is prevented from rotating about the center axis.

Such a slit groove 711 may be formed to be longer in the axial direction than the movable range of the tie rod so as not to restrict the steering angle of wheels.

Meanwhile, in order to reduce the impact and friction between the inner side surface of the slit groove 711 and the supporting portion 611 when the sliding bar 110 is slid in the axial direction while receiving the torque of the motors 130 and 140, the coupling member 610 may include a first bush 612 coupled to the support portion 611 (see FIG. 9) or a second bush 1001 in which the sliding bar 110 is supported on the inner surface of the slit groove 711 (see FIG. 10).

The first bush 612 and the second bush 1001 may be made of a rubber material or an engineering plastic material such as POM (polyacetal), PA (polyamide), PC (polycarbonate), PI (polyimide), PBT (polybutylene terephthalate), so that shock and friction can be reduced, and thus the driver's steering sensitivity can be improved.

Although not illustrated in the drawings, the coupling member 610 may include the first bushing 612, and the sliding bar 110 may include the second bush 1001.

Then, the sliding bar 110 may include an anti-rotation bar 301 including the second spline 711, and one or more screw bars 302 including the screws 112 and 113.

One or two screw bars 302 are provided, and any one of the anti-rotation bar 301 and the screw bar 302 includes the engagement groove 320 and the other may include the engagement part 310. The feature in which the engagement groove 320 and the engagement part 310 are screwed to each other, press-fitted to each other, or screwed to and press-fitted to each other is the same as the embodiments described above, and thus a detailed description thereof will be omitted.

In addition, the feature in which the sliding bar 110 includes the first screw 112 and the second screw 113 to be connected to the first motor 130 and the second motor 140 via the first gear box 150 including the first pulley 151 or the like and the second gear box 160 including the second motor pulley 161 or the like is the same as the embodiments described above, and thus a detailed description thereof will be omitted.

In addition, the screw direction of the first screw 112 and the screw direction of the second screw 113 may be the same as each other, or may be opposite each other, so that the durability and strength of the coupling member 610 and the slit groove 711 can be improved. Since the screw directions are opposite each other, the torques applied to the sliding bar 110 by the first motor 130 and the second motor 140 will cancel out each other.

Meanwhile, the steer-by-wire type power steering apparatus 600 according to embodiments includes a sliding bar positioner 1300. The first motor 130 and the second motor 140 have different reduction ratios relative to the sliding bar 110, and the position of the sliding bar 110 may be determined by the sliding bar positioner 1300 based on the difference in rotation information due to the difference in the reduction ratio.

Hereinafter, descriptions will be made with reference to FIGS. 13 to 16.

The steer-by-wire type power steering apparatus 100 or 600 according to the present embodiments may include a sliding bar positioner 1300 that determines the moving position of the sliding bar 110 based on first rotation information that is rotation information of the first motor 130 or the first gear box 150 and second rotation information that is rotation information of the second motor 140 or the second gear box 160.

In addition, the first motor 130 and the sliding bar 110 may have a first reduction ratio, and the second motor 140 and the sliding bar 110 may have a second reduction ratio different from the first reduction ratio.

In other words, since the first reduction ratio and the second reduction ratio have different values, when the sliding bar 110 is slid, the rotating angle of the motor shaft of the first motor 130 and the rotating angle of the motor shaft of the second motor 140 have different values, so that the first rotation information and the second rotation information do not coincide with each other.

The first reduction gear ratio and the second reduction gear ratio may be determined based on the first gear box 150, the second gear box 160, the first screw 112, the second screw 113, and the like. In other words, the first reduction gear ratio and the second reduction gear ratio may be determined based on the pitches, interval, inclinations, or the like of the first screw 112 and the second screw 113, or may be determined based on the diameters of the first motor pulley 151, the first nut pulley 153, or the like.

The first and second rotation information are phase information, and the sliding bar positioner 1300 may determine the moving position of the sliding bar 110 based on the phase difference between the first rotation information and the second rotation information.

Referring to the drawings, the sliding bar positioner 1300 includes a rotation information receiver 1301 that receives first rotation information and second rotation information, a rotation information monitor 1302 that monitors changes in the first rotation information and the second rotation information, and a positioner 1303 that determines the moving position of the sliding bar 110 based on a monitoring result.

The first rotation information and the second rotation information received by the rotation information receiver 1301 may be the rotation information of the first motor 130 and the rotation information of the second motor 140, respectively. Alternatively, the first rotation information and the second rotation information may be rotation information of each component of the first gear box 150 and rotation information of each component of the second gear box 160, respectively. For example, the first rotation information may be the rotation information of the first motor pulley 151 or the rotation information of the first belt 152.

The rotation information receiver 1301 may receive the first rotation information and the second rotation information from a sensor (not illustrated) that measures rotation information of a motor, a gear box, and the like. For example, a motor position sensor (not illustrated) provided in each of the first motor 130 and the second motor 140 may receive the rotation information of the motor shaft.

The motor position sensor may be driven in a low power mode. Since the vehicle battery is connected to a power source of the motor position sensor, the position sensor is capable of determining the position of the sliding bar 110 even when the ignition of the vehicle is turned off.

In addition, the rotation information monitor 1302 monitors rotation information. Specifically, the rotation information monitor 1302 may monitor changes in the first rotation information and the second rotation information, a phase difference between the first rotation information and the second rotation information, and the like.

For example, the rotation information monitor 1302 may monitor an absolute angle change of each rotation information, and may monitor the number of times the phase difference between the first rotation information and the second rotation information becomes zero.

The positioner 1303 may determine the moving position of the sliding bar 110. Specifically, the positioner 1303 may determine the position of the sliding bar 110 based on the result of monitoring by the rotation information monitor 1302.

According to an embodiment, the positioner 1303 may determine the moving position of the sliding bar 110 using Equation 1.

$$R = \frac{K}{360} \times \theta + K \times n \quad \text{Equation 1}$$

R is the moving position of the sliding bar 110, θ is the phase difference between the first rotation information and the second rotation information, K is the moving distance of the sliding bar 110 until the phase difference between the first rotation information and the second rotation information is changed from zero (0) and becomes the next zero (0) while the sliding bar 110 slides to one side, and n is the number of times the phase difference becomes zero while the sliding bar 110 slides to one side.

In Equation 1, the unit of deg is used for θ, but when the unit of rad is used, $2\pi$ will be substituted for 360.

According to an embodiment, the positioner 1303 may determine the position of the sliding bar 110 based on a preset reference value. For example, the positioner 1303 may determine the position of the sliding bar 110 in comparison with Table 1 based on the monitoring result of rotation information.

TABLE 1

| Stroke | First Rotation Information | Second Rotation Information |
|---|---|---|
| 0 | 0 | 0 |
| 0.01 | 1.4 | 1.5 |
| 0.02 | 2.8 | 2.9 |
| 0.03 | 4.2 | 4.4 |
| 0.04 | 5.6 | 5.8 |
| 0.05 | 6.9 | 7.3 |
| ... | ... | ... |
| ... | ... | ... |

Referring to Table 1, strokes corresponding to the positions of the sliding bar 110 are set in advance depending on the first rotation information and the second rotation information. In an embodiment, the positioner 1303 may determine the position of the sliding bar 110 using Equation 2 and Equation 3.

$$A = \{(\text{first rotation information} + 360n) \times \text{first reduction ratio} \quad \text{Equation 2}$$

$$B = \{(\text{second rotation information} + 360m) \times \text{second reduction ratio} \quad \text{Equation 3}$$

Here, A is the position of the sliding bar 110 determined based on the first rotation information and the first reduction ratio, B is the position of the sliding bar 110 determined based on the second rotation information and the second reduction ratio, n and m are integers that respectively cause A and B not to exceed the maximum stroke of the sliding bar 110.

Similarly, in Equation 2 and Equation 3, the first rotation information and the second rotation information are used in the unit of deg, and when used in the unit of rad, $2\pi$ will be put instead of 360.

According to Equation 2 and Equation 3, the position of the sliding bar 110 is an intersection of A and B.

FIG. 14 is a flowchart of a sliding bar positioning method.

In step S1, rotation information is received. Specifically, the sliding bar positioner 1300 may receive the first rotation information and the second rotation information from a sensor that detects the first rotation information and the second rotation information.

In step S2, rotation information is monitored. Specifically, the sliding bar positioner 1300 may monitor absolute angles, relative angles, phase differences, and the like of the received first rotation information and second rotation information.

In step S3, the position of the sliding bar 100 is determined. Specifically, the sliding bar positioner 1300 may determine the position of the sliding bar 110 based on the monitoring results of the first rotation information and the second rotation information.

FIG. 15 is a view for explaining an example of determining the position of the sliding bar 110.

FIG. 15 represents the phases of the first motor 130 and the second motor 140 and the stroke values of the sliding bar 110 according to the phases in a belt-type steering apparatus in which the first reduction ratio and the second reduction are determined by the lead widths of the first screw 112 and the second screw 113.

FIG. 15 represents the results derived using the values in Table 2 below.

TABLE 2

| | | | |
|---|---|---|---|
| $1^{st}$ screw lead | 7 mm | $2^{st}$ screw lead | 6.7 mm |
| Belt reduction ratio | 2.7 | Stroke | 156 mm |
| $1^{st}$ motor lock to lock | 60.2 rev | $2^{nd}$ motor lock to lock | 62.9 rev |
| Least common multiple of $1^{st}$ and $2^{nd}$ screw leads/($1^{st}$ screw lead) | 67 | Phase difference between 1st and 2nd motors | 5.14 deg |
| per rack stroke 0.1 mm Rotating angle of $1^{st}$ motor | 13.9 deg | per rack stroke 0.1 mm Rotating angle of $2^{nd}$ motor | 14.5 deg |

If Equation 2 and Equation 3 are used based on the values of Table 2, it is possible to determine the position of the sliding bar 110. FIG. 16 is a block diagram of the sliding bar positioner 1300 according to the present embodiments.

As illustrated in FIG. 16, a computer system 1600 such as the sliding bar positioner 1300 may include one or more elements selected from one or more processors 1610, memory 1610, a storage unit 1630, a user interface input unit 1640, and a user interface output unit 1650, which may communicate with each other through a bus 1660. In addition, the computer system 1600 may also include a network interface 1670 for connecting to a network. The processor 1610 may be a CPU or a semiconductor device that executes processing instructions stored in the memory 1620 and/or the storage unit 1630. The memory 1620 and the storage unit 1630 may include various types of volatile/nonvolatile storage mediums. For example, the memory 1620 may include ROM 1624 and RAM 1625.

Although all the elements constituting embodiments of the present disclosure have been described above as being combined into a single unit or combined to be operated as a single unit, the present disclosure is not necessarily limited to such embodiments. That is, at least two elements of all structural elements may be selectively joined and operate without departing from the scope of the present disclosure.

In addition, since terms, such as "including," "comprising," and "having" mean that one or more corresponding components may exist unless they are specifically described to the contrary, it shall be construed that one or more other components can be included. All the terms that are technical, scientific or otherwise agree with the meanings as understood by a person skilled in the art unless defined to the contrary. Common terms as found in dictionaries should be interpreted in the context of the related technical writings not too ideally or impractically unless the present disclosure expressly defines them so.

The above embodiments have been described merely for the purpose of illustrating the technical idea of the present disclosure, and those skilled in the art will appreciate that various modifications and changes are possible without departing from the scope and spirit of the present disclosure. Therefore, the embodiments disclosed in the present disclosure are intended to illustrate the scope of the technical idea of the present disclosure, and the scope of the present disclosure is not limited by the embodiment. The scope of the present disclosure shall be construed on the basis of the accompanying claims in such a manner that all of the technical ideas included within the scope equivalent to the claims belong to the present disclosure.

What is claimed is:

1. A steer-by-wire type power steering apparatus comprising:
   a cylinder provided inside a housing and comprising a first spline on an inner circumferential surface of the cylinder; and
   a sliding bar inserted into the cylinder and comprising a second spline engaged with the first spline and first and second screws, wherein the second spline of the sliding bar is disposed between the first screw and the second screw of the sliding bar,
   wherein the sliding bar comprises an anti-rotation bar comprising the second spline and at least one screw bar comprising the first and second screws.

2. The steer-by-wire type power steering apparatus of claim 1, wherein:
   the first screw of the sliding bar is disposed adjacent to one end of the second spline of the sliding bar, and the second screw of the sliding bar is disposed adjacent to another end of the second spline of the sliding bar, and
   screw directions of the first screw and the second screw of the sliding bar are formed in different directions from each other.

3. The steer-by-wire type power steering apparatus of claim 1, wherein any one of the anti-rotation bar and the screw bar comprises an engagement groove recessed in an axial direction and a remaining one comprises an engagement part inserted into the engagement groove.

4. The steer-by-wire type power steering apparatus of claim 3, wherein the engagement part is screwed to the engagement groove, press-fitted to the engagement groove, or screwed and press-fitted to the engagement groove.

5. The steer-by-wire type power steering apparatus of claim 1,
   wherein one or more motors comprise a first motor connected to the first screw via a first gear box and a second motor connected to the second screw via the second gear box.

6. The steer-by-wire type power steering apparatus of claim 5, wherein a screw direction of the first screw and a screw direction of the second screw are opposite each other.

7. The steer-by-wire type power steering apparatus of claim 5, further comprising:
   a sliding bar positioner that determines a moving position of the sliding bar based on first rotation information, which is rotation information of the first motor or the first gear box, and a moving position of the sliding bar based on second rotation information, which is rotation information of the second motor or the second gear box,
   wherein the first motor and the sliding bar have a first reduction ratio, and the second motor and the sliding bar have a second reduction ratio different from the first reduction ratio.

8. The steer-by-wire type power steering apparatus of claim 7, wherein the first rotation information and the second rotation information are phase information, and
   wherein the sliding bar positioner determines the moving position of the sliding bar based on a phase difference between the first rotation information and the second rotation information.

9. The steer-by-wire type power steering apparatus of claim 8, wherein the sliding bar positioner comprises a rotation information receiver configured to receive the first rotation information and the second rotation information, a rotation information monitor configured to monitor a change in the first rotation information and the second rotation information, and a positioner configured to determine the moving position of the sliding bar based on a monitoring result.

10. The steer-by-wire type power steering apparatus of claim 9, wherein the rotation information monitor monitors the phase difference and a number of times the phase difference becomes zero (0).

11. A steer-by-wire type power steering apparatus comprising:
- a cylinder provided inside a housing and comprising a first spline on an inner circumferential surface of the cylinder, and
- a sliding bar inserted into the cylinder and comprising a second spline engaged with the first spline and first and second screws, wherein:
- the second spline of the sliding bar is disposed between the first screw and the second screw of the sliding bar,
- a first motor is connected to the first screw of the sliding bar, and
- a second motor is connected to the second screw of the sliding bar.

12. A steer-by-wire type power steering apparatus comprising:
- a cylinder disposed inside a housing and comprising a first spline on an inner circumferential surface of the cylinder; and
- a sliding bar inserted into the cylinder and comprising a second spline engaged with the first spline, the sliding bar having screw bars configured to be slidable in an axial direction by one or more motors to steer one or more wheels, wherein:
- at least one of the screw bars is connected to a ball nut configured to be rotated by the one or more motors,
- the screw bars comprise a first screw bar positioned adjacent to one end of the second spline of the sliding bar and a second screw bar positioned adjacent to another end of the second spline of the sliding bar, and
- a screw of the first crew bar and a screw of the second screw bar are formed in different directions from each other.

13. The steer-by-wire type power steering apparatus of claim 1, further comprising a sliding bar positioner configured to receive first rotation information of a first motor or a first gear box connected to the first screw and second rotation information of a second motor or a second gear box connected to the second crew, monitor a change in the first rotation information and the second rotation information, and determine a moving position of the sliding bar based on a monitoring result.

\* \* \* \* \*